United States Patent Office 3,517,310
Patented June 23, 1970

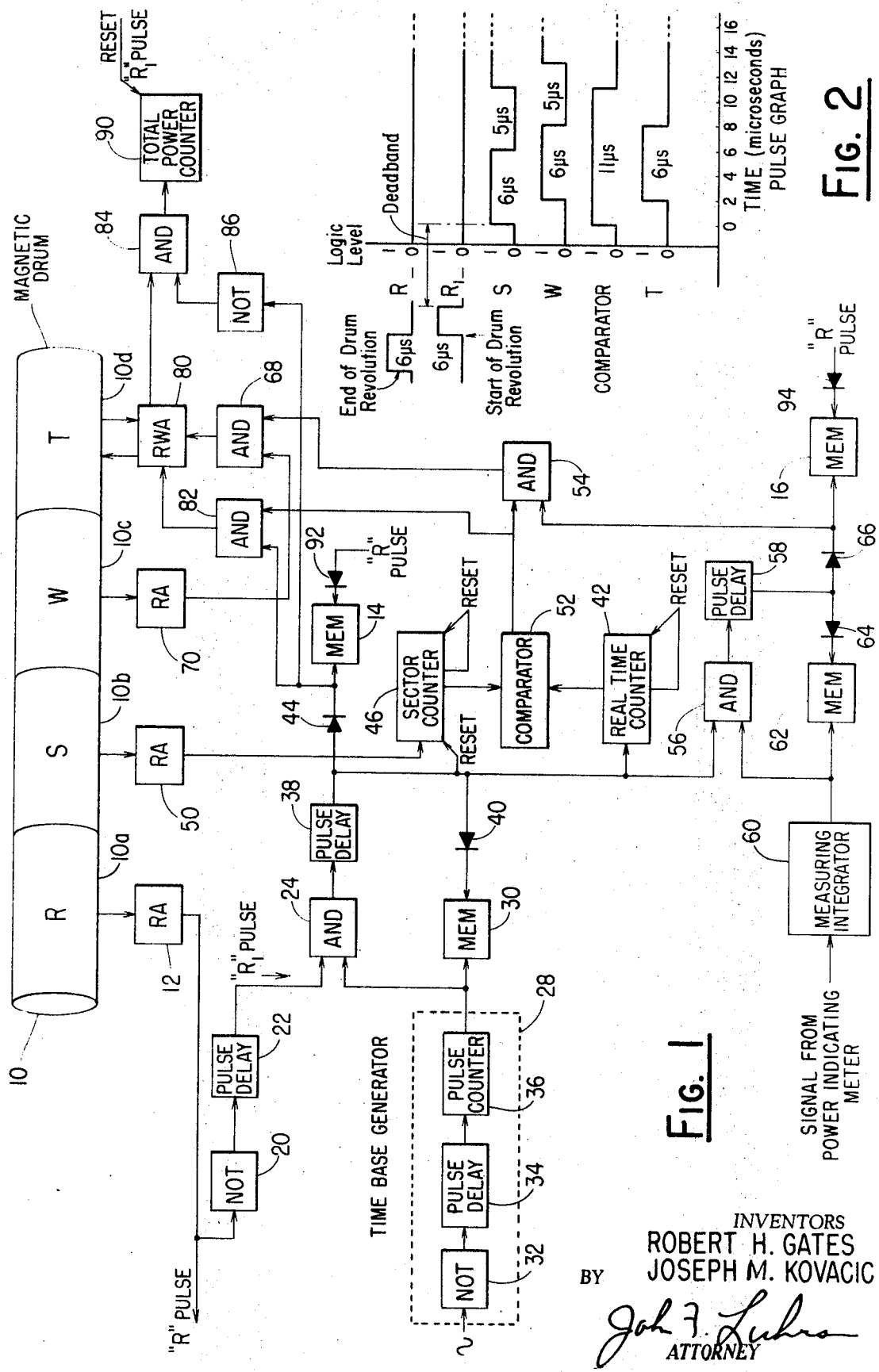

---

3,517,310
CONTINUALLY INTEGRATING USAGE COMPUTER HAVING MEANS TO BRIEFLY STORE POWER DEMAND INFORMATION
Robert H. Gates, Eastlake, and Joseph M. Kovacic, Chesterland, Ohio, assignors to Bailey Meter Company, a corporation of Delaware
Filed June 11, 1968, Ser. No. 736,201
Int. Cl. G01r 19/16; G06f 15/56
U.S. Cl. 324—103                     6 Claims

ABSTRACT OF THE DISCLOSURE

An apparatus for measuring and recording the highest average usage of electric power or gas during a fixed time period where the period of time continuously changes its starting and ending times but remains fixed in length. An integrator supplies pulses to a storage medium at a rate proportional to power or gas usage with the storage medium continuously updating the stored information. The information stored in the storage medium is available for display or control purposes.

BACKGROUND OF THE INVENTION

Field of the invention

This invention relates to control systems and more particularly to a power demand predicting computer control system particularly adapted to control large industrial loads.

Industrial power is furnished industrial consumers by public utility companies on the basis of various cost schedules. A typical charge for power consumption may be based on the highest average power usage for a fixed demand period (typically 10 minutes) during a billing period, i.e., one month. It is, therefore, essential to provide the consumer with a system which will monitor power consumed during each billing period so that full advantage may be made of the rate schedule established by the public utility.

DESCRIPTION OF THE PRIOR ART

Many industrial loads are of such an erratic nature that the instantaneous rate of power consumption may vary widely from the average consumption. Therefore, attempts to manually control power level on the basis of an analog record of instantaneous power consumption results in a regulation of power level which depends on the intuitive ability of the operator for accuracy.

Attempts have been made in the past to anticipate loads on the basis of computations made at equally spaced intervals within a demand period and projecting these values through the demand period, controlling the load in accordance with this projected or anticipated demand. These systems are concerned primarily with reducing the load or maintaining the load less than the predetermined demand limit and thus do not utilize the maximum available load throughout the demand period. Accordingly, power which might be consumed at a cheaper rate is not consumed. In other words, the load anticipation does not contain provision for maintaining the highest possible load factor on the system.

SUMMARY OF THE INVENTION

The computer system which is the subject of this invention integrates the power used during a demand period thus providing an accurate indication of the average power consumed during the demand period. This integration is performed continuously such that the starting and ending times continuously change, but the demand period remains fixed in length. The subject system thus provides a method of accurately monitoring the power consumed thereby insuring economic operation of the consumer's facility.

BRIEF DESCRIPTION OF THE DRAWING

FIG. 1 is a schematic illustration of a circuit embodying our invention.

FIG. 2 is a pulse graph representation of computer synchronization and data logic levels.

DESCRIPTION OF THE PREFERRED EMBODIMENT

The discussion of the construction and operation of the continually integating usage computer as depicted in FIG. 1 will employ terms which are defined as follows:

A demand period is an interval, usually ten minutes, set by the power company, on which the billing rate for a period of time, such as a month, is based.

Real time increments are divisions of the demand period.

Maximum demand is the maximum power consumption during any demand period within the billing period and is used in establishing the billing rate.

Demand limit is a predetermined value of power consumption for the demand period, set by the power company, which establishes the base billing rate. Normally, if the demand limit is exceeded, the billing rate is materially increased; whereas, if the power consumption does not equal the demand limit, there is no reduction made in the billing rate. Ordinarily, therefore, it is desirable to have the power consumption equal, but not exceed, the demand limit.

Referring to the drawing, there is illustrated in block form a storage medium 10 comprised of four information tracks 10a, 10b, 10c and 10d and adapted to rotate at a constant speed by an electric motor (not shown). The endless storage medium depicted in the drawing is a magnetic drum, but the operative function of said magnetic drum could readily be achieved by comparable magnetic storage media such as a magnetic tape or magnetic core storage. The information tracks consist of three synchronizing tracks 10a, 10b and 10c and one data track 10d. The magnetic pulses stored on the synchronizing tracks establish the operational format which controls the scanning, addressing and data acquisition functions of our invention. A synchronizing track generator (not shown) writes the synchronizing tracks on the magnetic drum such that track 10a contains one magnetic pulse, "R" pulse, to designate the completion of a drum revolution, and an equal number of pulses on tracks 10b, and 10c, "S" pulses and "W" pulses respectively, to represent the number of real time increments in the demand period. The data pulses stored on track 10d represent the power consumption rate as measured by measuring integrator 60.

Measuring integrator 60 is a type well known in the art as a means of generating electrical pulses at a rate proportional to the rate of power consumed. A typical apparatus for fulfilling this requirement is the General Electric Impulse Generator Model D-41 operating in conjunction with a power indicating meter. The method whereby said data pulses are applied to the read-write amplifier 80 of data track 10d will be explained in a subsequent discussion of the operation of the invention.

The read amplifiers 12, 50 and 70, associated with drum tracks 10a, 10b and 10c, are devices well known in the art whereby information is "read off" the respective drum tracks. Read-write amplifier 80, which is associated with track 10d, provides means whereby information is both "written-on" and "read-off" drum track 10d. A read-write amplifier consists of a combination read amplifier and write amplifier and means for external switching between the read and write modes of operation. A typical write amplifier consists of circuitry which transforms logic pulses into current pulses which, when applied to the inductive coil of a magnetic head mounted on the drum, magnetizes an area or spot on the ferrous coating on the drum surface. A read amplifier amplifies the small voltage pulses which are detected by the magnetic head when a magnetized area of the drum passes said head. The magnetic flux at each area or spot points in one of two opposite directions indicating that either a logic 0 or logic 1 is being stored. Some amplifiers accomplish the same result by magnetizing an area to represent a logic 1 while representing a logic 0 by a non-magnetized area. The sensing of stored information is accomplished by means of relative motion between the drum surface and the magnetic head. The changing flux lines that pass through the head induce a voltage the polarity of which indicates whether a logic 0 or a logic 1 is being detected.

It will be assumed, for the purpose of a concise explanation of our invention, that the number of real time increments in the demand period is 3000, thus determining the number of "S" and "W" pulses to be written on the drum. The selection of 3000 as the number of real time intervals and the number of "S" and "W" pulses is not arbitrary; rather it is based on calculations which indicate that the anticipated number of pulses from measuring integrator 60 shall not exceed 3000 in a demand period. This determination must be made to insure sufficient data intervals on the "T" track 10d of drum 10 to store all pulses from integrator 60. Each time increment will be 200 milliseconds since the 3000 real time increments will span a demand period selected to be 10 minutes or 600 seconds. The standard drum revolution rate is 1800 r.p.m. which corresponds to a period of 33⅓ milliseconds for each drum revolution.

The single "R" pulse present on track 10a is detected by read amplifier 12 every 33⅓ milliseconds or six times during each 200 millisecond demand period increment. A six microsecond logic ONE output pulse is generated by amplifier 12 in response to the presence of the "R" pulse. Amplifier 12 output pulse is applied as a reset pulse to logic memories 14 and 16 as well as being applied as a system synchronization pulse to NOT element 20. The inverted logic output of NOT 20 is applied to pulse delay 22 which triggers on the positive slope of the NOT output pulse and generates a six microsecond logic ONE "R₁" pulse which lags the "R" pulse by six microseconds. The lag time insures sufficient time for the reset of memories 14 and 16 by the "R" pulse. The "R₁" pulse is applied as an input pulse to AND gate 24 where it enables AND gate 24 to transmit the logic condition stored in memory 30 by time base generator 28.

Time base generator 28 consists of NOT element 32, pulse delay 34 and pulse counter 36. Sinusoidal line voltage is reduced in magnitude by a transformer (not shown) and converted to a 60 Hz. square wave line signal by NOT element 32. Pulse delay 34 is triggered by the positive slope voltage steps of said square wave signal and generates output pulses of preset duration to counter 36 at a rate of 60 pulses/second. Pulse delay 34 functions to generate a pulse of sufficient duration to step counter 36. Pulse counter 36 is wired to emit one output pulse for every twelve pulses generated by delay 34 and then reset to zero. The operation of counter 36 establishes a time base generator output pulse rate of 5 pulses/second or one pulse every 200 milliseconds. It is noted that the two-hundred millisecond time duration between generator 28 output pulses corresponds to the demand period increments defined previously. As will be apparent from subsequent discussions, the only restriction on the drum revolution rate is that at least two full drum revolutions occur in every demand period time interval, one of said drum revolutions allotted for entering data and the second allotted for reading the stored data.

Assuming the presence of a time base pulse, delay 38 will generate an output pulse which resets memory 30 through OR element 40, increments real time counter 42, sets memory 14 through OR element 44 for one drum revolution and resets sector counter 46 to zero.

Counter 46, which is incremented continuously by the synchronization pulses detected by read amplifier 50, is cycled through the count of 3000 six times for every 3000 count cycle of counter 42. The digital values present in counter 42 and counter 46 are compared in comparator 52 and result in an output pulse to one input of AND gate 54 when the count value in each of said counters is equal. Therefore, during each demand period, time interval six compare pulses are generated. Comparator 52 can be any one of several devices well known in the art which accept dual digital inputs and generate an output when coincidence exists between the inputs. Such a device is the Bailey Meter Company Digital Comparator No. 6617194-1 which is described in Instruction Section E93-40. Although counters 42 and 46 are prewired to reset on the count of 3000, the counter reset action performed by the logic output pulse of delay 38 functions as a redundant reset signal for counter 46 to assure a zero count when real time counter 42 is incremented. The second input to AND gate 54 is derived from memory 16 which is set by coincidental pulses to AND gate 56 from pulse delay 38 and measuring integrator 60. The occurrence of a pulse from integrator 60 will set memory 62 and apply a logic ONE level to one input of AND gate 56. The presence of a time base logic ONE pulse at the second input of AND gate 56 will establish a logic ONE output pulse which will be applied as an input pulse to delay circuit 58. The pulse output of delay 58 will then in turn reset memory 62 through OR element 66. Memory 62 having been reset is now in condition for accepting a subsequent pulse from integrator 60. The function of pulse delays 38 and 58 is to produce a pulse of sufficient duration to set memories 14 and 16 respectively before resetting memories 30 and 62.

The comparator 52 logic ONE output pulse and the logic ONE pulse of memory 16 coincidentally produce a logic ONE output from AND gate 54 which is applied as one input to AND gate 68. The second input to AND gate 68 is derived from read amplifier 70 which detects the synchronization pulses written on track 10c. The "W" pulse, which corresponds to the "S" sector that established coincidence in comparator 52, gates the output pulse of AND gate 54 to the corresponding sector on track 10d by means of read-write amplifier 80. Read-write amplifier 80 is maintained in the read mode except during the drum revolution following the first comparator 52 output pulse caused by coincidence in count values in counters 42 and 46 in each demand period increment. Read-write amplifier 80 is switched to the write mode by a logic ONE pulse from AND gate 82; said pulse being produced by the coincidence of logic ONE inputs to gate 82 from memory 14, which was set by the output pulse of gate 24, and from comparator 52. Amplifier 80 is retained in the write mode for the duration of the comparator logic ONE output pulse. The comparator output pulse drops to a logic ZERO when counter 46 is incremented, and the count value in said counter no longer equals the count value in counter 42. The write mode activating pulse of AND gate 82 is initiated two microseconds before the "W" pulse and corresponds to the "S" pulse that established the comparator 52 output logic pulse. The two-microsecond lag time before the occurrence of the "W" pulse represents the time relationship between the start of the "S" pulse which generates the comparator output and the "W" pulse which corresponds to the drum sector represented by said "S" pulse. The enable logic level output of AND gate 82 is maintained for a period of time corresponding to the 6 microsecond logic ONE period during which said "S" pulse is present and a 5 microsecond logic ZERO period following the "S" pulse before the next "S" pulse appears. Therefore, the eleven microsecond period in which read-write amplifier 80 is set in the write mode fully accommodates the six microsecond "W" pulse which gates the logic data pulse output of gate 54 through AND gate 68 for storage in the corresponding sector of data track 10d.

Referring to the pulse graph of FIG. 2, the corresponding pulse sectors of the respective drum tracks are illustrated as well as the relationship of the "R" pulse to the "$R_1$" pulse and the comparator 52 output pulse to the "S", "W" and "T" pulses. As noted previously, the "R" pulse, which designates the completion of a drum revolution, produces a six microsecond logic ONE pulse which, when inverted in NOT 20 and applied to pulse delay 22, establishes an "$R_1$" pulse of six microsecond duration. The duration of logic pulses appearing on drum 10 are based on a drum revolution rate of 1800 r.p.m., and any variation in drum speed will result in a change in pulse duration. A deadband of a desired length is established between the "$R_1$" pulse and the first set of "S" and "W" pulses. The purpose of the deadband is to compensate for variation in drum speed by providing drum space which will permit expansion of the pulse train without loss of a pulse due to pulse overlap. The "S" and "W" tracks are comprised of 3000 logic ONE pulses of six microsecond duration and logic ZERO levels of five microsecond duration between each of said logic ONE pulses. As illustrated in FIG. 2, the "W" pulse lags its corresponding "S" pulse by two microseconds thereby insuring adequate time for the "W" pulse to respond to a comparator 52 output pulse by applying an enable pulse to AND gate 68 for writing data on the corresponding "T" sector. The compare pulse illustrated in FIG. 2 represents, for the purpose of explanation, the condition wherein comparator 52 receives a real time counter 42 output signal equivalent to the first "S" sector following the start of a drum revolution. The comparator 52 logic ONE output, resulting from a number one count coincidence of counters 42 and 46, is maintained from the start of the number one "S" pulse until sector counter 46 is incremented by the number two "S" pulse. The data entered on "T" track appears simultaneously with the "W" pulse which gates said data pulse through read-write amplifier 80 to the first data location on track 10d. It is apparent from FIG. 2 that read-write amplifier 80 is switched to the write mode prior to the occurrence of a gated data pulse and is maintained in said write mode for a period of time following the data pulse thereby insuring the acknowledgement of said data pulse.

During the drum revolution in which a time base pulse is gated through AND gate 24 the logic ONE level stored in memory 14 disables AND gate 84 by generating a logic ZERO output from NOT element 86. Therefore, during the drum revolution in which data is entered on drum track 10d, total power counter 90 will not be incremented. At the start of the drum revolution, immediately following said data storage revolution, the occurrence of an "R" pulse will reset memories 14 and 16 through OR elements 92 and 94 respectively. Memory 14 having been reset, NOT element 86 will no longer disable AND gate 84, and the data stored on track 10d will be displayed in total power counter 90. Total power counter 90 is reset at the start of every drum revolution by the "$R_1$" pulse. The power usage rate displayed in counter 90 will be updated during the drum revolution following the drum revolution in which a data pulse is written on track 10d. The reset of memory 14 by the "R" pulse will also disable AND gate 82 thereby preventing a comparator 52 output pulse from setting read-write amplifier in the write mode. The disabling of AND gate 82 until a subsequent time base pulse is gated by AND gate 24, renders the recording system insensitive to the multiple comparator 52 pulses which result from the multiple cycles of sector counter 46 that occur between increments of real time counter 42.

Assume a situation where AND gate 82 is not disabled after the initial compare pulse gates an integrator pulse to track 10d. The logic ZERO level applied to AND gate 54 by memory 16 would be the result of the reset action of the "R" pulse following the data storage drum revolution and would not be related to the output condition of integrator 60. Therefore, the gating of a plurality of logic ZERO pulses, falsely representing integrator 60 pulses, to track 10d could result in an erroneous power usage indication by entering a logic ZERO pulse on track 10d where a logic ONE integrator pulse had been entered by the initial compare pulse.

The operation of the system in response to a logic ZERO output from integrator 60 is identical to that discussed in relation to a logic ONE output from integrator 60. The occurrence of a time base pulse, as indicated by an output pulse from delay 38, will check the condition of memory 62 which reflects the output condition of integrator 60. Assuming the existence of a logic ZERO condition at the output of integrator 60, which indicates that an integrator pulse has not been generated in the previous demand period increment, the input to AND gate 54 from memory 16 will be a logic ZERO. Therefore, AND gate 54, which has been enabled by the first comparator output pulse corresponding to the existing real time count value, will establish a logic ZERO output level which in turn establishes a logic ZERO at the output of AND gate 68, said ZERO level being entered on track 10d during the period in which read-write amplifier 80 is set in the write mode by AND gate 82.

Various changes may be made in the details of construction without departing from the spirit and scope of the invention as defined by the appended claims.

What we claim as new and desire to secure by Letters Patent of the United States is:

1. An integrating computer for continually accumulating power consumption data during preset time intervals of a demand period, the combination comprising:

a rotatable, continuous, magnetic storage means having a plurality of storage tracks, the period of rotation of said magnetic storage means being less than said demand period time interval;

at least three continuous synchronizing tracks on said storage means, each track programmed with a set number of magnetically polarized spots, the first of said tracks having one spot, said spot designating the end of each rotation of the storage means, whereas the second and third tracks each contain a set number of magnetic spots which equal the number of demand period time increments and exceed the number of probable data pulses to be generated in a demand period;

at least one data track on said storage means for storing pulses representing power consumption rate;

measuring integrator means for generating data pulse outputs at a rate proportional to power consumption;

means for generating time base pulses at a rate corresponding to the time increments of the demand period;

means associated with the synchronizing tracks to gate the data pulses generated by said measuring integrator in accordance with the time base pulses for storage in said data track; and means operative during preselected revolutions of said storage means to store the data pulses in said data track, said means rendering the stored data available for readout during all other revolutions of the storage means.

2. An integrating computer for continually accumulating power consumption data during preset time intervals of a demand period as claimed in claim 1 including:

read amplifier means associated with each of the synchronization tracks, said amplifiers generating output pulses in response to the magnetized spots in the respective tracks; and a read-write amplifier means associated with the data track, said amplifier entering data pulses on said data track during preselected revolutions of the storage means and rendering the stored data available for readout during all other revolutions of the storage means.

3. An integrating computer for continually accumulating power consumption data during preset time intervals of a demand period as claimed in claim 2 including:
- a first counter means responsive to the synchronizing pulses generated by the read amplifier associated with the second synchronizing track and generating an output signal which is indicative of the time increment represented by the synchronization pulse;
- a second counter means responsive to the pulses from said time base pulse generating means and generating an output signal which is indicative of the demand period time interval represented by the time base pulse; said counter resetting to zero at the end of each demand period; and
- logic means enabled by the end of revolution pulse generated by the read amplifier associated with the first synchronizing track, said logic means gating the time base pulse to said second counter coincidentally with the occurrence of said end of revolution pulse and said end of revolution pulse setting said first counter to zero such that said first counter initiates a count cycle in coincidence with each increment of said second counter.

4. An integrating computer for continually accumulating power consumption data during preset time intervals of a demand period as claimed in claim 3 including a comparator circuit having two inputs and an output, the first input connected to the output of said first counter means, the second input connected to the output of said second counter means, said comparator generating a logic output pulse when said input signals are equal.

5. An integrating computer for continually accumulating power consumption data during preset time intervals of a demand period as claimed in claim 4 including logic means responsive to the coincidence of a time base pulse and a comparator pulse to set the read-write amplifier in the write mode for the first revolution of the storage means following the comparator output pulse and resetting said amplifier to the read mode for all other revolutions of the storage means which occur prior to the next time base increment of the second counter.

6. An integrating computer for continually accumulating power consumption data during preset time intervals of a demand period as claimed in claim 5 including logic means responsive to the synchronization pulses of the third synchronizing track for gating the integrator pulses to said read-write amplifier means for entering said pulses in specific locations on said data track, each of said track locations coinciding with a specific demand period time increment as represented by the time base pulse which increments the second counter means, whereby the stored condition of each data location on said data track is updated once every demand period at the rate of one location every demand period time interval.

References Cited
UNITED STATES PATENTS

| 2,836,730 | 5/1958 | Early | 235—151.21 XR |
| 2,994,038 | 7/1961 | Russell et al. | 324—103 |

RUDOLPH V. ROLINEC, Primary Examiner

E. F. KARLSEN, Assistant Examiner

U.S. Cl. X.R.

235—151.21